(12) United States Patent
Meyers et al.

(10) Patent No.: US 11,474,996 B1
(45) Date of Patent: Oct. 18, 2022

(54) SYSTEMS AND METHODS FOR RAPIDLY PROVISIONED DATA MANAGEMENT SERVICES

(71) Applicant: Amazon Technologies, Inc., Seattle, WA (US)

(72) Inventors: Ian Meyers, East Molesey (GB); Maheshdatta Mishra, Naperville, IL (US)

(73) Assignee: Amazon Technologies, Inc., Seattle, WA (US)

( * ) Notice: Subject to any disclaimer, the term of this patent is extended or adjusted under 35 U.S.C. 154(b) by 379 days.

(21) Appl. No.: 16/711,308

(22) Filed: Dec. 11, 2019

(51) Int. Cl.
*G06F 16/23* (2019.01)
*G06F 16/9532* (2019.01)
*G06F 9/445* (2018.01)

(52) U.S. Cl.
CPC ...... *G06F 16/2379* (2019.01); *G06F 9/44568* (2013.01); *G06F 16/9532* (2019.01)

(58) Field of Classification Search
CPC .......................... G06F 16/2379; G06F 16/9532
See application file for complete search history.

(56) References Cited

U.S. PATENT DOCUMENTS 8,856,077 B1 * 10/2014 Roth ..................... G06F 9/5072
707/638
2013/0166596 A1 * 6/2013 Stumpf ................. H04L 63/102
707/783

* cited by examiner

*Primary Examiner* — Kannan Shanmugasundaram
(74) *Attorney, Agent, or Firm* — Knobbe, Martens, Olson & Bear, LLP

(57) ABSTRACT

System and methods are provided for rapid provisioning of data management services. A user creates a data management service through a user interface. The creation of the data management services is initiated by the user without any programming by the user in a scalable, rapidly provisioned environment. The data management service natively supports the CRUD model (create, read, update, and delete) for data entities, metadata, references, as well as other features, such as search capabilities and/or data lineage. Once the data management service has been provisioned, the service scales as usage of the service increases. The data management service is an abstraction layer and the organization that created the service can remain unaware of the underlying implementation details of the service.

21 Claims, 14 Drawing Sheets

Example Data Management Service Calls

Read/Get Entity ⎫ 502
HTTP GET https://<data service address>/123

Verify ⎫ 504
HTTP HEAD https://<data service address>/123

Create/Update Entity ⎫ 506
HTTP PUT https://<data service address>/123
    {Entity: {attribute1:"abc", attribute2:"xyz"}}

Create/Update Metadata ⎫ 508
HTTP PUT https://<data service address>/123
    {Metadata: {CostCentre:"4003", owner:"johnDoe"}}

Create/Update Reference ⎫ 510
HTTP PUT https://<data service address>/123
    {References:[{"Entity": "MyItem", "Id":"54321"}]}

Delete Entity ⎫ 512
HTTP DELETE https://<data service address>/123

Delete Attribute ⎫ 514
HTTP DELETE https://<data service address>/123 {Entity:["Attribute4"]}

Example Data Management Service Calls

Read/Get Entity ⟶ 502
```
HTTP GET https://<data service address>/123
```

Verify ⟶ 504
```
HTTP HEAD https://<data service address>/123
```

Create/Update Entity ⟶ 506
```
HTTP PUT https://<data service address>/123
        {Entity: {attribute1:"abc", attribute2:"xyz"}}
```

Create/Update Metadata ⟶ 508
```
HTTP PUT https://<data service address>/123
        {Metadata: {CostCentre:"4003", owner:"johnDoe"}}
```

Create/Update Reference ⟶ 510
```
HTTP PUT https://<data service address>/123
        {References:[{"Entity": "MyItem", "Id":"54321"}]}
```

Delete Entity ⟶ 512
```
HTTP DELETE https://<data service address>/123
```

Delete Attribute ⟶ 514
```
HTTP DELETE https://<data service address>/123 {Entity:["Attribute4"]}
```

*FIG. 5A*

Additional Example Data Management Service Calls

Read/Get Entity ⎯502
HTTP GET https://<data service address>/123
516
{
   522
518   "ResourceNumber": "rn:<region>:<account number>:<entity name>:<entity identifier>",
      "Metadata": {
         "CostCenter": "9994",
         "LastUpdateDate": "2019-10-10 15:14:10",
520      "LastUpdatedBy": "6B832BF072E847E892D0A662DD43D780"
      },
      "Entity": {
         "EntityVersion": 32,
         "LastUpdateDate": "2019-10-07 07:40:25",
         "LastUpdatedBy": "6B832BF072E847E892D0A662DD43D780",
         "attr1": "value1",
         "attr2": "value2",
         "attr3": "value3",
         "attr4": "value4",
         "attr5": "value5-123",
         "id": "123"
      }
}

*FIG. 5B*

Additional Example Data Management Service Calls

Get Resource Metadata ⟵ 523
HTTP GET https://<data service address>/123/metadata Query by Attribute ⟵ 524
HTTP GET https://<data service address>/queryEntity:="{"attribute2":"value2-102"}"

Data Lineage Searches ⟵ 526A
HTTP GET https://<data service address>/123/downstream?search_depth=1 ⟵ 526B
HTTP GET https://<data service address>/123/upstream?search_depth=10

Configure Natural Language Search ⟵ 528
HTTP PUT https://<data service address>/configure_search
{ElasticSearchDomain:"<domain>", StreamServiceIamRoleRN="<resourceNumber>"}

Service Provisioning ⟵ 542
HTTP PUT https://<data service address>/provision/Content
PrimaryKey=contentIdentifier TableIndexes=contentName ⟵ 544
HTTP PUT https://<data service address>/provision/Content
ElasticSearchDomain=<domain> StreamServiceIamRoleRN=<resourceNumber>

*FIG. 5C*

Additional Example Data Management Service Calls

Set an Item Master  ⌐530
HTTP PUT https://<data service address>/item_master id=45678
ItemMasterID=456789
                ⌐532
HTTP/1.1 200 OK Update Non-Master Entity  ⌐534
HTTP PUT https://<data service address>/45678
Entity:='{"attr1":"value1","attr2":"value2","attr3":"value3","attr4":"value4","ItemVersion":2}'
                ⌐536
HTTP/1.1 200 OK
{            ⌐538
    "Warning": [
        {
            "ItemMasterID": "456789",
            "Message": "Updated Non Item Master",
            "id": "45678"
        }
    ]
}

*FIG. 5D*

Example Data Management Service Response Types
HTTP 200 (OK) – OK
HTTP 400 (Bad Request) – Failed Request or invalid parameters
HTTP 404 (Not Found) – Invalid entity reference or unimplemented feature
HTTP 409 (Conflict) – Validation Exception
HTTP 500 (Internal Server Error) – Unhandled Exception
*FIG. 6*

Example Schema Definition

```
               702
HTTP PUT https://<data service address>/schema/entity
      {
704   "$id": "https://<schema address>/user.schema.json",
      "$schema": "http://json-schema.org/draft-07/schema#",
      "title": "user",
      "type": "object",
      "required": [ "email","fname", "lname" ],
      "properties": {
        "email": {
          "type": "string",
          "description": "Email Address"
        },
        "fname": {
          "type": "string",
          "description": "First Name"
        },
        "lname": {
          "type": "string",
          "description": "Last Name"
        },
        "mi": {
          "type": "string",
          "description": "Middle Initial"
        },
      "additionalProperties": true
      }
```

*FIG. 7*

SYSTEMS AND METHODS FOR RAPIDLY PROVISIONED DATA MANAGEMENT SERVICES

BACKGROUND

Many organizations rely on critical data that often ends up in silos. For example, many organizations use databases, such as relational databases, that store data in silos. Moreover, such databases typically do not natively support services that allow the data to be shared with other applications. Multiple versions of the same data entity can occur in one or more silos such that it may be unclear which data entity is authoritative. A common approach to data management is to feed multiple data sets of entities into a data lake or data warehouse. Multiple computing system architectures typically need to be integrated in a data lake or warehouse approach, which can require programming by development teams.

BRIEF DESCRIPTION OF THE DRAWINGS

These and other features, aspects and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

FIGS. 5A-5D illustrate example data management service calls.

FIG. 6 illustrates example data management service response types.

FIG. 7 illustrates an example data management service call and schema definition.

DETAILED DESCRIPTION

Figure 1:
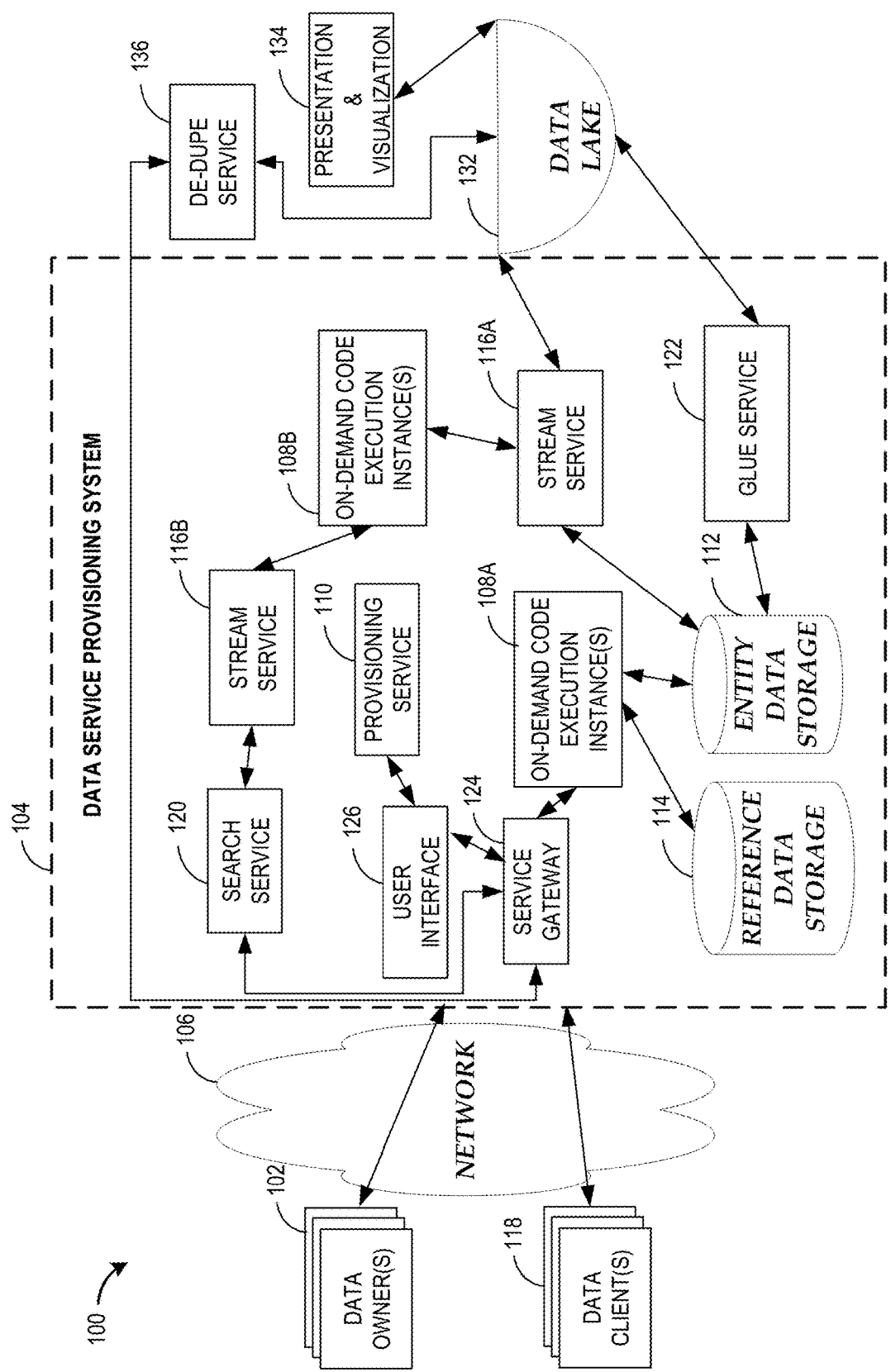
FIG. 1 is a schematic block diagram depicting an illustrative network environment for implementing a data service provisioning system.

Generally described, aspects of the present disclosure are directed to system and methods for rapid provisioning of data management services. A data management service, such as an Application Programming Interface ("API"), can be created in seconds. The creation of the data management services can be initiated by the user without any programming by the user in a scalable, rapidly provisioned environment, often referred to as a "serverless" or "cloud computing" environment. The data management service can natively support the CRUD model (create, read, update, and delete) for data entities, metadata, references, as well as other features, such as search capabilities and/or data lineage, as described herein. Once the data management service has been provisioned, the service can scale as use of the service increases. The data management service can be an abstraction layer and the organization that created the service can remain unaware of the underlying implementation details of the service.

As described above, in some existing systems, critical data can end up in silos, there can be many versions of data that can include duplicates, and/or organizations may have to perform data management to determine authoritative data among multiple versions and/or duplicate data. In some existing systems, many different organizations with different underlying data sets may take the same approach to data management, which can include programming data lake or data warehouse solutions to feed data from multiple sources into a single repository and to determine authoritative data from the single repository. Thus, many different organizations often program and create custom solutions to address the same or similar data management issues in different contexts.

The systems and methods described herein may improve data management technology by obviating the need for organizations to program custom solutions for data management issues that can be common to many different organizations or contexts. The solutions described herein may also be intrinsically tied to service-orientated architecture, serverless, and/or cloud computing technologies. Unlike some existing solutions, a user can create a data management service with an easy-to-use user interface and without any programming. The implementation details of the data management service can advantageously be abstracted from the organization. The data owner that creates the data management service advantageously does not have to directly setup any data stores or any other underlying architecture. Moreover, the data management service can advantageously scale by being implemented in an on-demand, virtualized environment. Thus, unlike some existing custom solutions that require development time, the systems and methods described herein can be rapidly provisioned for data management. Moreover, the systems and methods described herein can be more scalable than some existing solutions.

The systems and methods described herein may improve over traditional relational databases. For example, a built-in feature of the data service provisioning system 104 can be data lineage tracking, which can include being able to identify the entities that are associated with another entity. A generated data management service can include a feature to query an entity and request related-entities, which is not a feature that is not included in typical relational databases. In other words, the system can support a query to ask an entity: What is this entity related to? A related feature in the data service provisioning system is that as entities are added, a graph of relationships of entities and how they relate to one another can be generated. Thus, the systems and methods described herein can be an improvement over existing relational-database technology.

As used herein, in addition to its ordinary and customary meaning, an "entity" can refer to a data object that can represent specific things that have a number of definable properties. For example, an entity can represent such things as a person, a user, a customer, a product, a digital item, and/or a document. Each entity may be associated with one or more identifiers that can uniquely identify the entity. The entity may have one or more attributes, such as a name, a creation or update date and/or time, a version, or any other information about the entity. An entity can be defined by a data owner, as described herein. A data owner can define a data schema for an entity. The data schema can be used to validate an entity. For example, if a create or update action for an entity violates the data schema for the entity, the client that submitted the action can receive an error.

As used herein, in addition to its ordinary and customary meaning, "metadata" can refer to data that further describes an entity. For example, metadata of a digital item can be an item category. As another example, metadata for an item can be a cost center. Metadata can be stored separately from entity data. Much like an entity, metadata can be defined by a data owner, as described herein. Thus, a data owner can define which attribute(s) are stored with an entity and which attribute(s) are stored separately as metadata. Thus, entity data and metadata can be independently created and/or modified. A data owner can also define a data schema for metadata. Thus, much like data schema for an entity, the data schema for metadata can be used to validate metadata. For example, if a create or update action for metadata violates the data schema for the metadata, the client that submitted the action can receive an error.

As used herein, in addition to its ordinary and customary meaning, a "reference" can refer to an association between two or more entities. A first entity can reference a second entity. For example, a first entity can be a user, person, or customer entity; a second entity can be a car, a house, or a media item entity. In the example, a reference between the first entity and the second entity can indicate, for example, that the user, person, or customer owns the car, house, or media item. In some embodiments, a reference can be directional. In other words, using the foregoing example, the first entity may be the parent and the second entity may be the child. Thus, the second entity may be downstream from the first entity and the first entity may be upstream from the second entity.

Turning to FIG. 1, an illustrative network environment 100 is shown in which a data service provisioning system 104 may rapidly provision and/or may operate data management services. The network environment 100 may include one or more data owners 102, one or more data clients 118, a data service provisioning system 104, a data lake 132, a de-duplication service 136, and presentation and visualization interfaces 134. The data service provisioning system 104 may include a user interface 126, a provisioning service 110, a service gateway 124, on-demand code execution instances 108A, 108B, an entity data storage 112, a reference data storage 114, stream services 116A, 116B, a glue service 122, and a search service 120. The constituents of the network environment 100 may be in communication with each other either locally or over a network 106. While certain constituents of the network environment 100 are depicted as being in communication with one another, any constituent of the network environment 100 can communicate with any other constituent of the network environment 100. For example, the on-demand code execution instances 108A, 108B can communicate with any constituent of the network environment 100; however, not all of these communication lines are depicted in FIG. 1.

The one or more data owners 102 may include any computing device capable of communicating with the user interface 126 and/or the service gateway 124 over the network 106, such as a client computing device. For example, a user can interact with the user interface 126 to cause a data management service to be created. The user interface 126 can be in communication with the service gateway 124. For example, communication between the user interface 126 and the service gateway 124 can be related to the creation and/or configuration of data management services. The provisioning service 110 can be responsible for instantiating the service and/or setting up the background data stores (such as data stores in the entity data storage 112 and/or the reference data storage 114) and/or other services (such as the stream service 116B and/or the search service 120). The one or more data clients 118 may be any computing device capable of communicating over the network 106 with the service gateway 124. The one or more data clients 118 and/or the data owners 102 can include computing devices capable of communicating over the network 106. Example computing devices include a laptop or tablet computer, personal computer, personal digital assistant (PDA), hybrid PDA/mobile phone, mobile phone, and/or a smartphone. In some embodiments, the user interfaces shown in FIGS. 3 and 4 may be presented on the computing devices.

The one or more data clients 118 and/or the data owners 102 can transmit requests (such as create, read, update, or delete actions) to the data management service. The service gateway 124 can include endpoints for the data management service to receive the requests. The service-orientated architecture described herein, including the data management services, can use authorization keys and roles for security purposes. The data management service may invoke on-demand code execution instances 108A, 108B in an on-demand code execution system to respond to the service requests. An example on-demand code execution system is Amazon's AWS lambda. Invoking service logic in the on-demand code execution system can cause code to be executed in a virtual machine instance. Additional details regarding an on-demand code execution system and on-demand code execution instances may be found in U.S. patent application Ser. No. 16/045,593, filed Jul. 25, 2018, entitled "REDUCING EXECUTION TIMES IN AN ON-DEMAND NETWORK CODE EXECUTION SYSTEM USING SAVED MACHINE STATES," which is hereby incorporated by reference in its entirety.

The entity data storage 112 and/or the reference data storage 114 may be embodied in hard disk drives, solid state memories, any other type of non-transitory computer-readable storage medium. The entity data storage 112 and/or the reference data storage 114 may also be distributed or partitioned across multiple local and/or remote storage devices. Each of the entity data storage 112 and/or the reference data storage 114 may include a data store. As used herein, in addition to its ordinary and customary meaning, a "data store" can refer to any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, tables in a database, comma separated values (CSV) files, eXtendible markup language (XML) files, TeXT (TXT) files, flat files, spreadsheet files, and/or any other widely used or proprietary format for data storage. The entity data storage 112 can include one or more entity data stores and metadata data stores. An entity or metadata data store can include a table in DynamoDB™, a distributed NoSQL database. The reference data storage 114 can store references between entities.

The network 106 may be any wired network, wireless network, or combination thereof. In addition, the network 106 may be a personal area network, local area network, wide area network, cable network, satellite network, cellular telephone network, or combination thereof. In addition, the network 106 may be an over-the-air broadcast network (e.g., for radio or television) or a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks, such as HTTP. Protocols and components for communicating via the Internet or any of the other aforementioned types of communication networks are well known to those skilled in the art of computer communications and thus, need not be described in more detail herein.

The one or more data owners 102, the one or more data clients 118, and the data service provisioning system 104 may each be embodied in a plurality of devices. For example, one or more data owners 102, the one or more data clients 118, and the data service provisioning system 104 may include a network interface, memory, hardware processor, and non-transitory computer-readable medium drive, all of which may communicate with each other by way of a communication bus. The network interface may provide connectivity over the network 106 and/or other networks or computer systems. The hardware processor may communicate to and from memory containing program instructions that the hardware processor executes in order to operate the one or more data owners 102, the one or more data clients 118, and the data service provisioning system 104. The memory generally includes RAM, ROM, and/or other persistent and/or auxiliary non-transitory computer-readable storage media.

The first stream service 116A can stream data from the entity data storage 112 to other sources. For example, as entity-related data is received by the data management service and added to the entity data storage 112, the first stream service 116A can transmit corresponding data to the data lake 132. The first stream service 116A can also feed data to the on-demand code execution instances 108B for indexing entity-related data. If natural language searching has been enabled for the data management service, the on-demand code execution instances 108B can also feed data to a search service 120 via the second stream service 116B. The service gateway 124 can communicate with the search service 120 with respect executing client search requests via the gateway 124. Entity-related data can also be fed into the data lake 132 via a glue service 122. An example glue service 122 is Amazon's AWS Glue. The glue service 122 can extract, transform, and load entity-related data into the data lake 132. Example data that can be in the data lake 132 can include a data catalog. Example data in the data catalog can include data definitions, pointers, and/or links to entity-related data in the entity data storage 112. The data in the data lake 132 can be used in the presentation and visualization interfaces 134. The data in the data lake 132 can also be processed by a de-duplication service 136 to identify duplicates and item masters, which can be communicated back to the data management service.

Additionally, in some embodiments, the data service provisioning system 104 or components thereof are implemented by one or more virtual machines implemented in a hosted computing environment. The hosted computing environment may include one or more rapidly provisioned and/or released computing resources. The computing resources may include hardware computing, networking and/or storage devices configured with specifically configured computer-executable instructions. A hosted computing environment may also be referred to as a "serverless," "cloud," or distributed computing environment.

Figure 2:
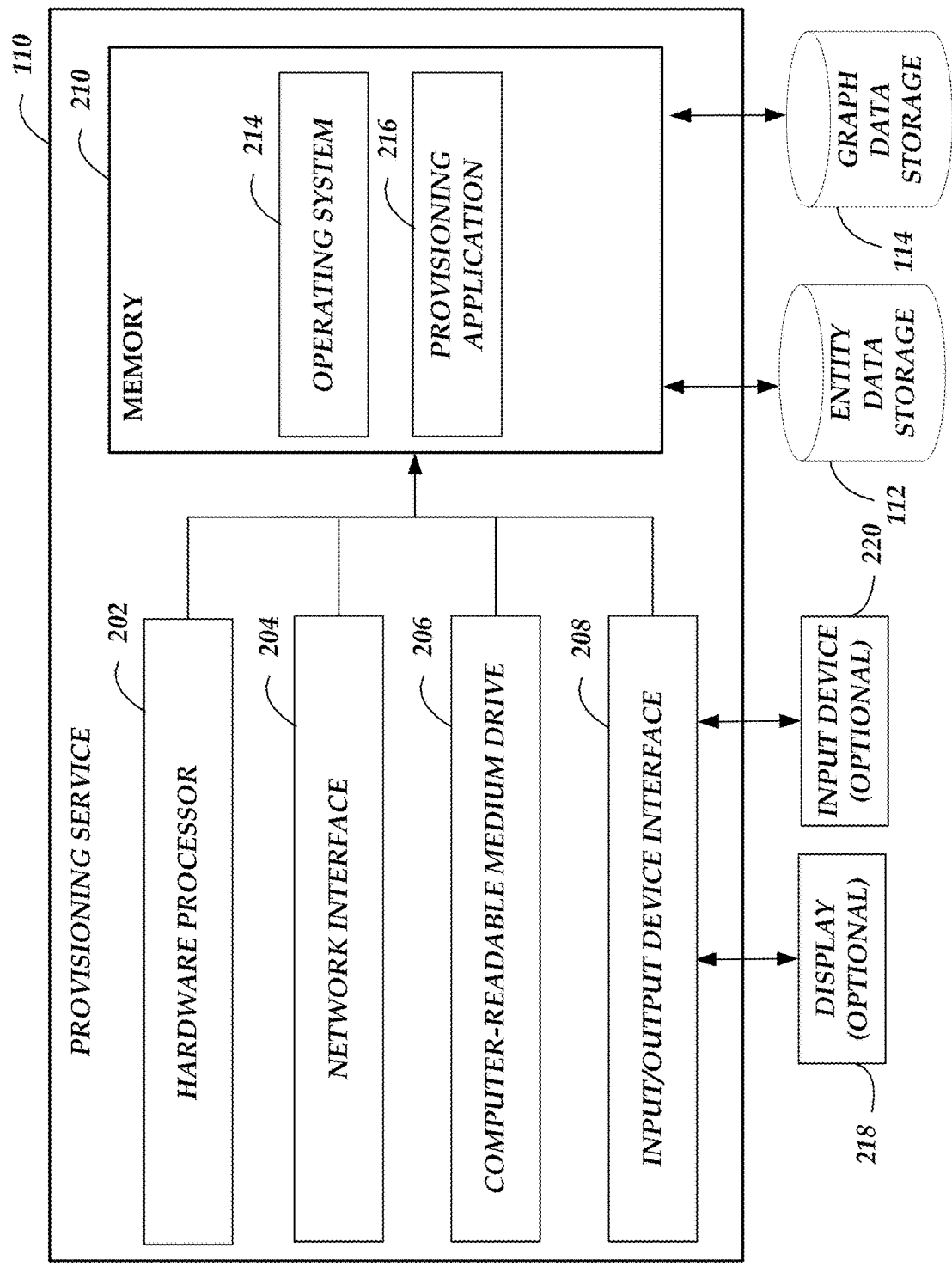
FIG. 2 is a schematic block diagram depicting an illustrative provisioning service of the network environment depicted in FIG. 1.

FIG. 2 is a schematic diagram of an illustrative provisioning service 110 that can be used in the environment 100 in FIG. 1. The provisioning service 110 includes an arrangement of computer hardware and software components that may be used to rapidly provision a data management service. While the general architecture of the provisioning service 110 is shown and described with respect to FIG. 2, the general architecture of FIG. 2 can be used to implement other services and/or applications described herein. Those skilled in the art will appreciate that the provisioning service 110 may include more (or fewer) components than those shown in FIG. 2. Further, other computing systems described herein may include similar implementation arrangements of computer hardware and software components.

The provisioning service 110 may include a hardware processor 202, a network interface 204, a non-transitory computer-readable medium drive 206, and an input/output device interface 208, all of which may communicate with one another by way of a communication bus. As illustrated, the provisioning service 110 is associated with, or in communication with, an optional display 218 and an optional input device 220. In other embodiments, the display 218 and input device 220 may be included in the one or more data owners 102 shown in FIG. 1. The network interface 204 may provide the provisioning service 110 with connectivity to one or more networks or computing systems. The hardware processor 202 may thus receive information and instructions from other computing systems (such as the data owners 102 and/or the data clients 118) or services via the network 106. The hardware processor 202 may also communicate to and from memory 210 and further provide output information for an optional display 218 via the input/output device interface 208. The input/output device interface 208 may accept input from the optional input device 220, such as a keyboard, mouse, digital pen, touch screen, accelerometer, gyroscope, or gestures recorded via motion capture and/or image recognition (e.g., eye, hand, head, and/or body part placement and/or recognition). The input/output device interface 220 may also output audio data to speakers or headphones (not shown).

The memory 210 may contain specifically configured computer program instructions that the hardware processor 202 executes in order to implement one or more embodiments of the provisioning service 110. The memory 210 generally includes RAM, ROM and/or other persistent or non-transitory computer-readable storage media. The memory 210 may store an operating system 214 that provides computer program instructions for use by the processing unit 202 in the general administration and operation of the provisioning service 110. The memory 210 may further include other information for implementing aspects of the provisioning service 110. For example, the memory 210 may communicate with the entity data storage 112 and/or the reference data storage 114. In some embodiments, the entity data storage 112 and/or the reference data storage 114 may store one or more data structures that can also be loaded into the memory 210.

The memory 210 may include a provisioning application 216 that may be executed by the hardware processor 202. In some embodiments, the provisioning application may implement various aspects of the present disclosure. For example, the provisioning application 216 may instantiate the data management service and/or may set up the background data stores (such as one or more tables in the entity data storage 112) and/or services.

Figure 3:
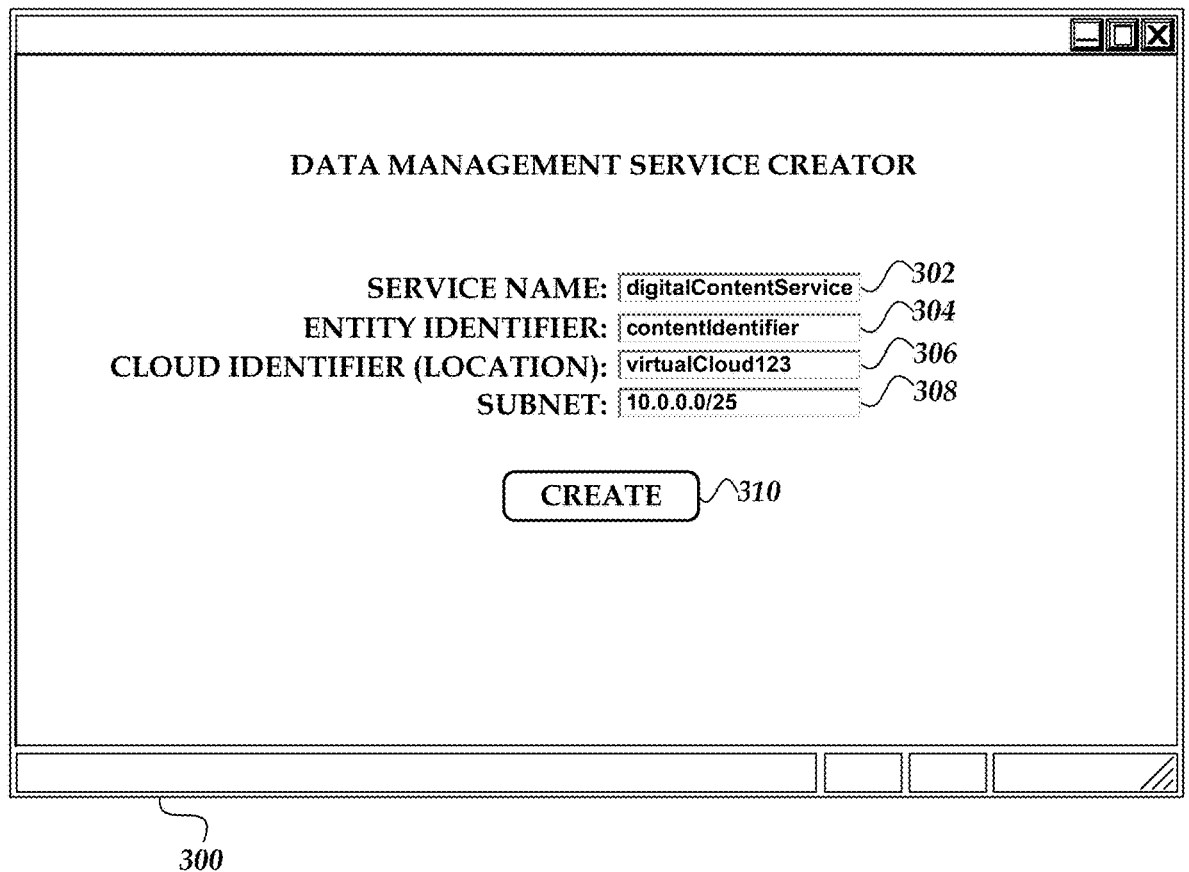
FIGS. 3 and 4 illustrate graphical user interfaces of a data management service provisioning process.
Figure 4:
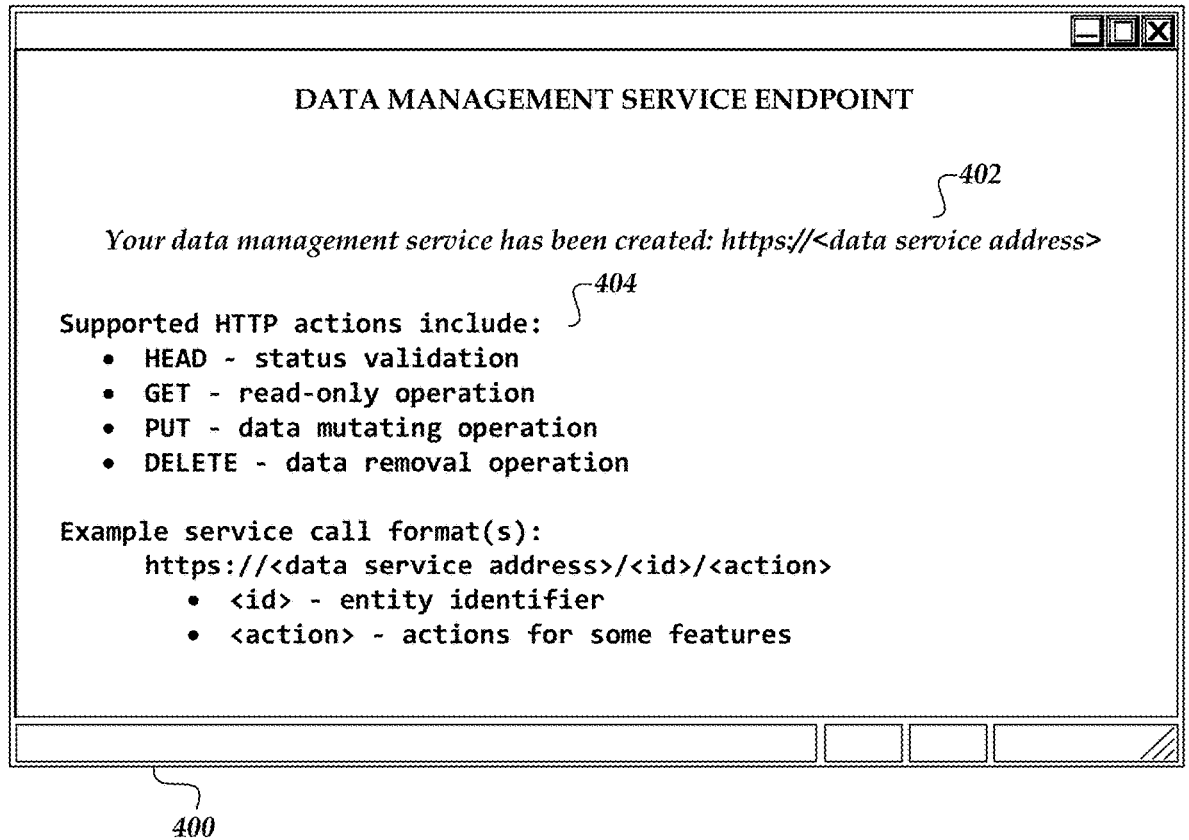

FIGS. 3 and 4 illustrate example user interfaces. In particular, FIGS. 3 and 4 illustrate example user interfaces of the data service provisioning system 104 described above with respect to FIG. 1. In various embodiments, aspects of the user interfaces may be rearranged from what is shown and described below, and/or particular aspects may or may not be included. The graphical user interfaces of FIGS. 3 and 4 can depict portions of a data management service provisioning process.

FIG. 3 illustrates an example user interface presented during an initial step of a data management service provisioning process. The user interface 300 may be displayed on a user computing device of the data owner 102. For example, the user interface 300 may be presented in a browser application. The user interface 300 can include user interface can include user input elements 302, 304, 306, 308 and a user input submission element 310. The user interface 300 can enable a user to specify basic information the data service provisioning system 104 can use to provision the data management service. For example, the user can specify a service name and an entity identifier. While not illustrated, in some embodiments, the user interface 300 or subsequent user interfaces can further enable a user to configure the entity, such as by providing a further entity definition, which can include additional attributes. While not illustrated, the subsequent user interfaces can further enable a user to configure metadata associated with the entity. In some embodiments, the user interface 300 can include user input elements related to a location for the data management service. The user input elements 306, 308 can be related to a hosted computing environment details, such as a specific virtual private cloud or subnet details.

In the example, the user can create a data management service for a digital content entity, which can arise in the context of a streaming media system. The resulting data management service (here "digitalContentService") can be responsible for maintaining digital content entities. The data owner and/or clients 102, 118 can issue commands to create, read, update, and delete digital content entities. A digital content entity and/or metadata can include attributes such as digital content name, publication year, country, length, genre, language, etc.

In some embodiments, the data service provisioning system 104 can provide additional or alternative methods for provisioning a data management service. For example, the data service provisioning system 104 can include a command line interface tool. A data owner 102 can provision a data management service using the command line interface tool. An example command can include: "./bin/setup-data-service content-id contentIdentifier-subnets <subnet>-table-indexes name-crawler-role glue-role". As described herein, the command can create a data management service for a digital content item, with an entity identifier of "contentIdentifier" and indexed by "name". The data service provisioning system 104 can also enable data management service provisioning via service calls, which is described in further detail below with respect to FIG. 5C.

FIG. 4 illustrates another example user interface presented during another step of a data management service provisioning process. After a data management service has been created, such as following receiving user input from the user interface 300 described above with respect to FIG. 3, the user interface 400 can provide information to the user to use the provisioned data management service. The user interface 402 can include a user interface element 402 that provides the user with an address for the data management service (here "https://<data service address>"). While illustrated in part as a placeholder, "<data service address>", the address can correspond to a uniform resource identifier (URI), such as specific uniform resource locator (URL). Once provisioned, the data owners and clients 112, 118 can begin using the data management service.

The user interface 402 can also include a user interface element 404 that informs the user of how to call the data management service. In some embodiments, the data management service can support HTTP method conventions. While some of the examples used herein use HTTP and/or HTTP method conventions, other service-orientated architecture protocols and/or formats can be used. As illustrated in the user interface element 404, supported actions can include: getting a status of a service or an entity (e.g., by using the HTTP HEAD method), retrieving an entity (e.g., by using the HTTP GET method), adding or modifying an entity (e.g., by using the HTTP PUT method), and/or deleting an entity (e.g., by using the HTTP DELETE method). Also as illustrated, an example data management service call can use a format (e.g., https://<data service address>/<id>/<action>) that can indicate the data management service address (e.g., <data service address>), followed by an identifier for the entity (e.g., <id>), and in some cases a specific action (e.g., <action>). Example data management service calls are described in further detail below with respect to FIGS. 5A-5C. As described herein, a data management service and the data service provisioning system 104 can use a JavaScript Object Notation (JSON) format for transmitting data, such as entity data, metadata, and references.

FIG. 5A illustrates some example data management service calls. The example data management service calls 502, 504, 506, 508, 510, 512, 514 of FIG. 5A illustrate calls that cause the data service provisioning system 104 to retrieve an entity, verify an entity, create or update an entity, create or update metadata, and create or update a reference. The data management service calls of FIG. 5A include the example identifier "123." Accordingly, the first service call 502, "HTTP GET https://<data service address>/123," can cause the data service provisioning system 104 to retrieve the entity with the identifier 123. The second service call 504, "HTTP HEAD https://<data service address>/123," can cause the data service provisioning system 104 to verify the status of the entity with the identifier 123. The response to the second service call can indicate whether an entity with the identifier 123 exists. Instead of the first service call 502 that potentially returns the entity, the second service call 504 returns a status of the entity.

The following data management service calls relate to modifying entities and entity-related data. The third service call 506, "HTTP PUT https://<data service address>/123 {Entity: {attribute1:'abc', attribute2:'xyz'}}," can cause the data service provisioning system 104 to either create or update an entity with the identifier 123 as specified in the data portion of the service call, "{Entity: {attribute1:'abc', attribute2:'xyz'}}," which can be in a JSON data format. The fourth service call 508, "HTTP PUT https://<data service address>/123 {Metadata: {CostCentre: '4003', owner: 'johnDoe'}}," can cause the data service provisioning system 104 to either create or update metadata for the entity with the identifier 123 as specified in the data portion of the service call, "{Metadata: {CostCentre:'4003', owner:'johnDoe'}}," which also can be in a JSON data format. The fifth service call 510, "HTTP PUT https://<data service address>/

123 {References:[{'Entity': 'MyItem', 'id':'54321'}]}," can cause the data service provisioning system 104 to either create or update one or more references for the entity with the identifier 123 as specified in the data portion of the service call, "{References:[{'Entity': 'MyItem', 'id': '54321'}]}," which also can be in a JSON data format. Following execution of the fifth service call, the entity with the identifier 123 can be associated with the other entity with the identifier 54321. An entity can have multiple references. The sixth service call 512, "HTTP DELETE https://<data service address>/123," can cause the data service provisioning system 104 to delete the entity with the identifier 123. The seventh service call 514, "HTTP DELETE https://<data service address>/123 {Entity:['attribute4']}," can cause the data service provisioning system 104 to delete an attribute of the entity with the identifier 123 to modify the entity.

FIG. 5B illustrates an example data management service call to retrieve an entity and corresponding entity response data. The service call 502 of FIG. 5B, "HTTP GET https://<data service address>/123," can be the same as the first service call 502 of FIG. 5A to cause the data service provisioning system 104 to retrieve an entity with the identifier 123. The entity response data 516 can be in response to the first service call 502. The entity response data 516 can be in a JSON data format. As depicted, the entity response data 516 can include metadata 518 and entity data 520. As shown, the response data 516 can include a resource number 522. The resource number 522 can uniquely identify an entity (or any other resource in the system) across data owner accounts and regions. In some embodiments, resource numbers can be partially or wholly generated by the data service provisioning system 104. As described herein, the resource numbers can be used to maintain relationships between entities, such as by maintaining directional relationships between entity resource numbers in a graph data store.

The resource numbers can include information that is used by the data service provisioning system 104. As depicted, the example resource number 522 can include a region, an account number, an entity name, and/or an entity identifier. The region can be used by the services to handle region-related requests. For example, if a data client 118 requests an entity from a first region (e.g., Europe), which can be identified from the resource number, from a data management service deployed in a second region (e.g., US), the data management service can respond accordingly. In the example, there may be restrictions between sharing and storing data across regions. Thus, the data management service can provide an error message or the data management service can respond with a redirect message (such as an HTTP 302 redirect) that causes the data client 118 to request data from a service deployed in Europe. The entity name can also include the environment, such as development (DEV), integration (INT), or quality assurance (QA), for example.

FIG. 5C illustrates additional example data management service calls. The example data management service calls 523, 524, 526A, 526B, 528 of FIG. 5C can illustrate calls for retrieving metadata, querying by attribute, finding related entities, and configuring natural language search for the data management service. The first service call 523 of FIG. 5C, "HTTP GET https://<data service address>/123/metadata," can cause the data service provisioning system 104 to retrieve metadata for the entity with the identifier 123. The second service call 524 of FIG. 5C, "HTTP GET https://<data service address>/queryEntity:='{'attribute2':'value2-102'}'," can cause the data service provisioning system 104 to query for an entity by an attribute. In the example, an entity is queried that has the attribute, "attribute2," with a particular value, "value2-102."

Some service calls can cause the data service provisioning system 104 to perform graph searches, which can also be referred to as data lineage searches. The third and fourth service calls 526A, 526B of FIG. 5C, "HTTP PUT https://<data service address>/queryEntity:='{'attribute2':'value2-102'}'," can cause the data service provisioning system 104 to search for entities that are associated with a particular entity. In particular, the third service call 526A of FIG. 5C, "HTTP GET https://<data service address>/123/downstream?search_depth=1," can cause the data service provisioning system 104 to search for downstream entities that have a search depth of one from the entity with the identifier 123. In particular, the fourth service call 526B of FIG. 5C, "HTTP GET https://<data service address>/123/upstream?search_depth=10," can cause the data service provisioning system 104 to search for upstream entities that have a search depth of ten from the entity with the identifier 123. A response to a graph search can be a collection of entities.

Some service calls can cause the data service provisioning system 104 to configure a data management service. The fifth service call 528 of FIG. 5C, "HTTP PUT https://<data service address>/configure search {ElasticSearchDomain: '<domain>', StreamServiceRoleRN='<resourceNumber>'}," can cause the data service provisioning system 104 to configure the service to support a natural language search.

An example data management service creation request is the sixth service call 542 of FIG. 5C. The example sixth service call 542 can cause a data management service for a digital content item to be created, with an entity identifier of "contentIdentifier" and indexed by "contentName". The seventh service call 544 of FIG. 5C can be similar to the fifth service call 528. As shown, part of the provisioning process can include configuring a natural language search service for the data management service as described herein.

FIG. 5D illustrates an example data management service calls related to data master management and respective responses. The first service call 530 of FIG. 5D, "HTTP PUT https://<data service address>/item_master id=45678 ItemMasterID=456789," can cause the data service provisioning system 104 to store an item master record between a first entity with a non-master identifier (here the first identifier "45678") and a second entity with a master identifier (here the second identifier "456789"). The first service call 530 can also be referred to as an item master request. The item master record can indicate that the second entity (here the entity with the identifier "456789") is the master of the first entity (here the entity with the identifier "45678"). The first entity can be a duplicate of the second entity. The item master record can be stored in the entity data storage 112. The first response 532 can indicate that the item master request 530 was successful and an association between the first entity and the second entity was successful.

The second service call 534 of FIG. 5D, "HTTP PUT https://<data service address>/45678 Entity:='{'attr1': value1","attr2":"value2","attr3":"value3","attr4":"value4", "ItemVersion":2}'," can cause the data service provisioning system 104 to attempt to update the first entity with the identifier "45678." In this example, if non-item master entity updates are permitted, the non-master entities can be updated, but an advisory warning that another entity is the master may be provided. Accordingly, the second response 536 can indicate that the entity update request 536 was successful; however, the second response 536 can include advisory warning data 538 of the existence of an item master for the entity. In some embodiments, while not illustrated, if non-item master entity updates are not permitted, then the entity update can be prevented and the response can include an exception that indicates that the entity update was denied and that an item master exists for the entity.

FIG. 6 illustrates example data management service response types. The response types 602, 604, 606, 608, 610 can be provided in response to a service call. The response types 602, 604, 606, 608, 610 can use HTTP response code conventions. For example, the data service provisioning system 104 can return a success response type 502, such as an "HTTP 200 (OK)" response, if the data service provisioning system 104 performed the requested action without error.

In some cases, the data service provisioning system 104 can return error types. The data service provisioning system 104 can return a "Bad Request" response type 504, such as an "HTTP 400 (Bad Request)" response, if the data service provisioning system 104 determined there was an issue with the request. In particular, the system 104 can fail to perform the request due to malformed request or invalid parameters. In some embodiments, the response with the "Bad Request" response type 504 can include text or other information describing the error, such as a structured payload with error information. The data service provisioning system 104 can return a "Not Found" response type 606, such as an "HTTP 404 (Not Found)" response, if the data service provisioning system 104 was unable to locate the entity or feature for the request. The data service provisioning system 104 can return a "Conflict" response type 608, such as an "HTTP 409 (Conflict)" response, if the data service provisioning system 104 was unable to validate data in the request. For example, if a create or update action was submitted in the request and the payload of the request is invalid according to a schema, then the data service provisioning system 104 can return the "Conflict" response type 608. The data service provisioning system 104 can return an "Internal Server Error" response type 610, such as an "HTTP 500 (Internal Server Error)" response, if the data service provisioning system 104 encountered any other type of exception while processing the request.

FIG. 7 illustrates an example data management service call and schema definition. Some service calls can cause the data service provisioning system 104 to configure a schema for a data management service. The service call 702 of FIG. 7, "HTTP PUT https://<data service address>/schema/entity { ... }," can cause the data service provisioning system 104 to either create or update an entity schema, which can be in a JSON data format. In the example, the payload 704 can include a schema for a user entity. The schema can define required properties for the user entity (here an email, first name, and last name). In the example, if a service call request is submitted to add or modify a user entity and the request is missing required information for the user entity, then the data service provisioning system 104 may respond with an error because validation failed. The service call 702 of FIG. 7 is another example of how a data management service can be modified by a service call after the service has been initially set up.

Figure 8:
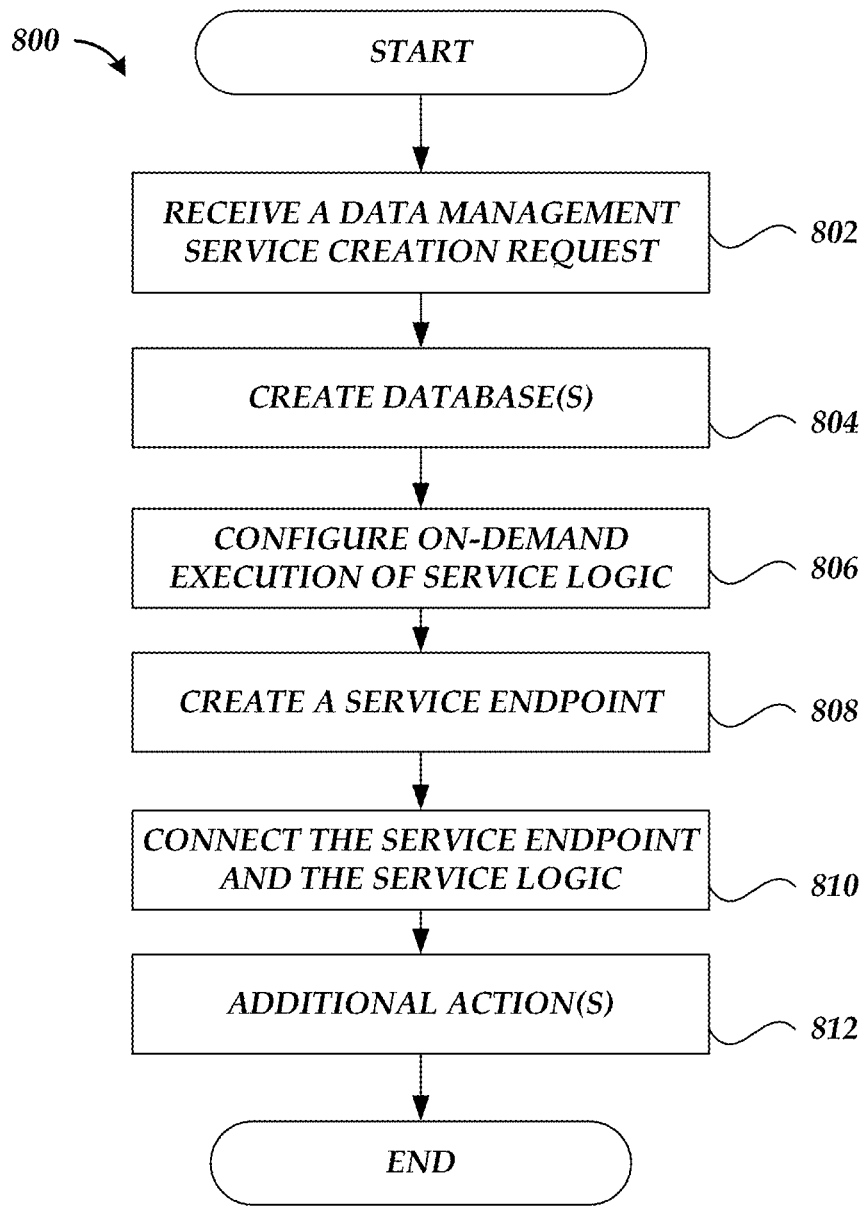
FIG. 8 is a flow diagram depicting an example method for processing data management service creation requests.

FIG. 8 is a flow diagram depicting an example method 800 implemented by the provisioning application 216 for processing data management service creation requests. As discussed above, in some embodiments, the provisioning service 110 may include the provisioning application 216, and may implement aspects of the method 800.

The example method 800 begins at block 802, where a data management service creation request can be received. In particular, the provisioning application 216 can receive a data management service creation request from a data owner 102. As described herein, the data owner 102 can include a user computing device. The data management service creation request can be received from a user interface, such as the user interface 300 described above with respect to FIG. 3 and/or the user interface 126 described above with respect to FIG. 1. As described herein, the data management service creation request can be received from a command line interface tool. The data management service creation request can also be a service call, such as the sixth service call 542 described above with respect to FIG. 5C. The data management service creation request can include information related to creating a data management service, such as a service identifier (e.g., a service name), entity information, and metadata information. The data management service creation request can also include user input indicating the attributes that the data service provisioning system 104 should index. The entity information can include an entity definition, which can include an entity identifier. The entity definition can include attribute types for an entity, such as the properties shown in the payload data 704 describe above with respect to FIG. 7. The metadata information can include a metadata definition, which can specify additional attribute types regarding an entity.

At block 804, one or more data stores can be created. In particular, the provisioning application 216 can create one or more data stores. The provisioning application 216 can create an entity data store, such as an entity table, based at least on the entity definition. For example, the provisioning application 216 can create attributes and/or keys in an entity table that correspond to attributes and/or identifiers specified in the entity definition. Similar to the creation of the entity data store, the provisioning application 216 can create a metadata data store, such as a metadata table, based at least on the metadata definition. The provisioning application 216 can create indexes on the entity and/or metadata data stores.

At block 806, service logic can be configured to be executed in an on-demand code execution system. In particular, the provisioning application 216 can configure service logic to be executed in an on-demand code execution system. The service logic can reference the entity data store and/or the metadata data store. For example, the service logic can include data management functions to create, update, or delete entity data and/or metadata as defined by the user. As described herein, an example on-demand code execution system is Amazon's AWS Lambda, and an example framework for configuring service logic in an on-demand code execution system is Amazon's AWS Chalice™. However, in some embodiments, the data service provisioning system 104 can provision data management services without using an on-demand code execution system.

At block 808, a service endpoint can be created. In particular, the provisioning application 216 can create a service endpoint for the data management service. The service endpoint can have an address. The provisioning application 216 can create a service endpoint for the service identifier. For example, the address for the service endpoint can include the service identifier, such as the name of the service. As described herein, example addresses for service endpoints can include URIs such as URLs. The service endpoint can be managed by the service gateway 124. An example service gateway is the Amazon API Gateway. Example endpoints are described in further detail above with respect to FIGS. 4, 5A, 5B, 5C, and 7. At block 810, the service endpoint can be connected to the service logic. In particular, the provisioning application 216 can connect the service endpoint and the service logic, which can be invoked in the on-demand code execution system. The service endpoint can be connected to the service logic such that when a client makes a data management service call the appropriate service logic can be invoked. An example framework for creating service endpoints and/or connecting the service endpoint to the service logic is Amazon's AWS Chalice™.

At block 812, additional actions can be performed. In particular, the data service provisioning system 104 can perform additional actions. For example, the data service provisioning system 104 can publish the service endpoint, which can make the service endpoint available on one or more networks. As another example, following provisioning of the data management service, the user interface 126 of the data service provisioning system 104 can cause presentation, in a user computing device, of an API for the service endpoint. An example user interface that presents the API for a service endpoint is the user interface 400 described above with respect to FIG. 4. Additional example actions are described below in further detail with respect to FIGS. 9A-9B and 10, such as receiving and responding to one or more data management service requests, such as entity-related service requests and/or configuration requests.

Figure 9A:
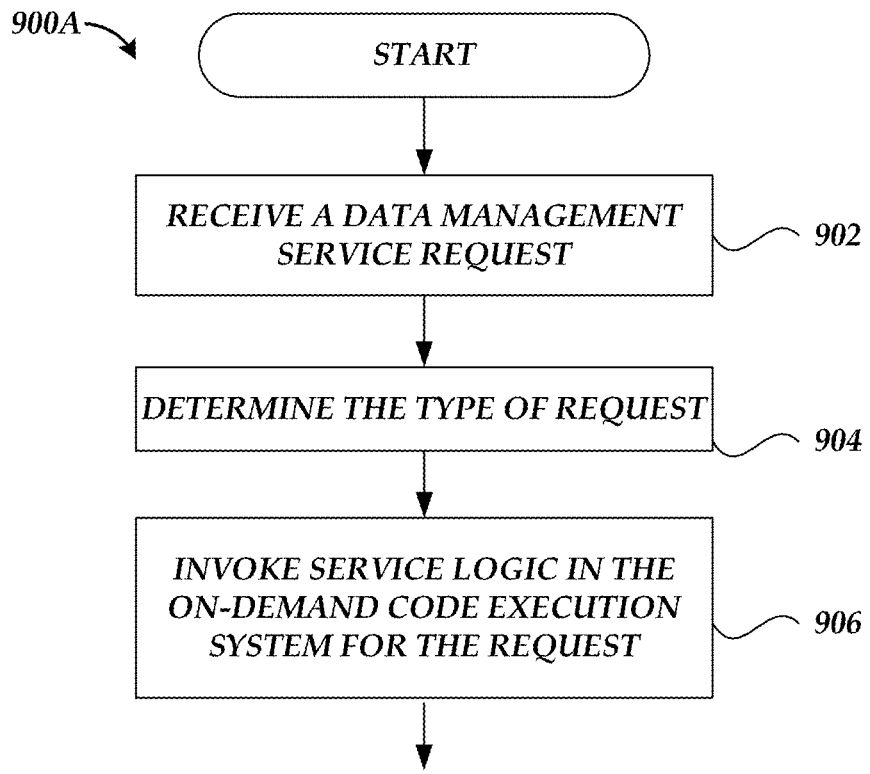
FIGS. 9A-9B are flow diagrams depicting an example method for processing data management service requests.
Figure 9B:
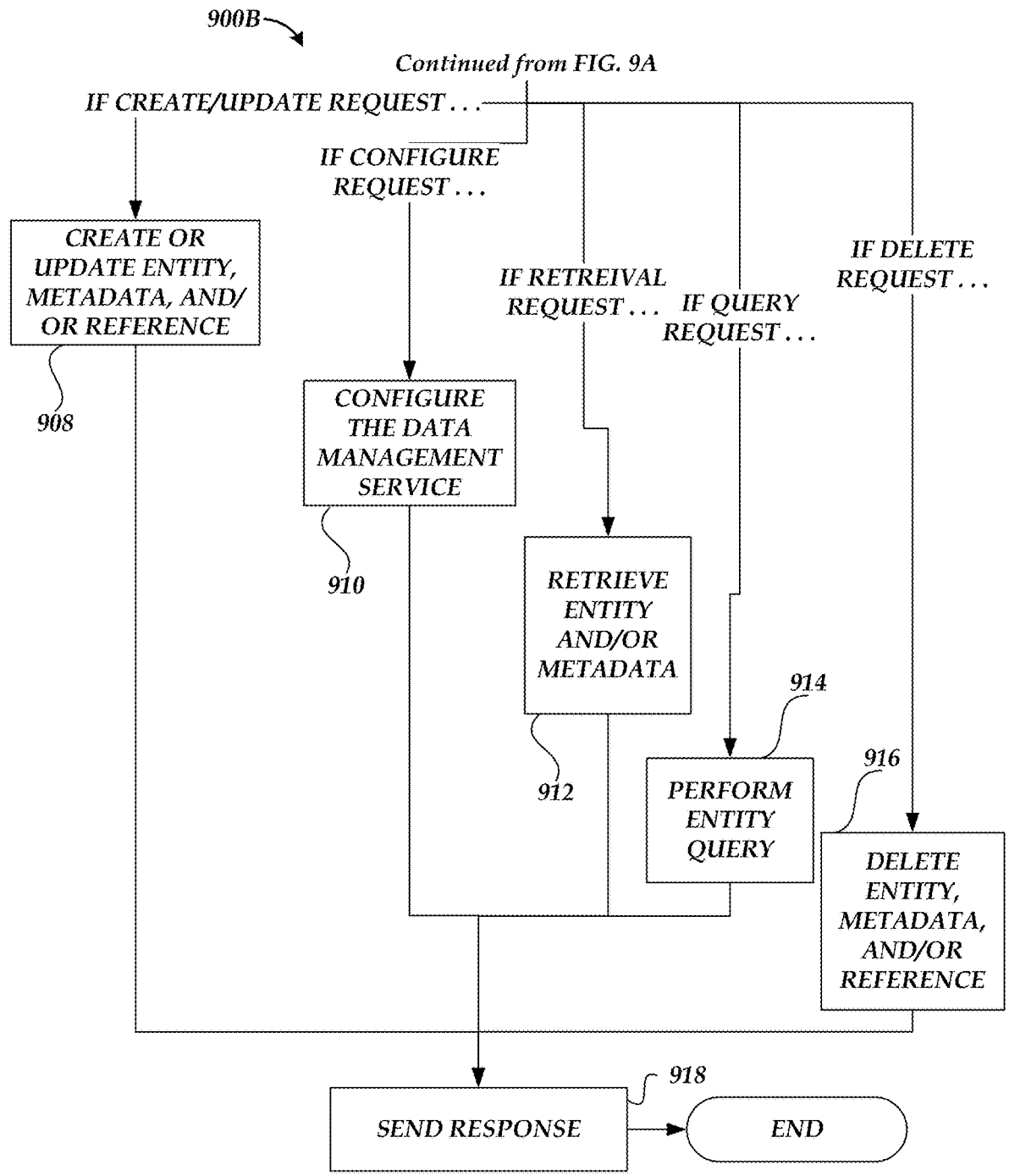

FIGS. 9A-9B are flow diagrams depicting an example method 900A-900B for processing data management service requests. The method 900A-900B can be implemented by components of the data service provisioning system 104, such as the service gateway 124, the on-demand code execution instance(s) 108A, 108B, and/or the search service 120.

Beginning at block 902, a data management service request can be received. In particular, a service endpoint at the service gateway 124 can receive a data management service request. A client computing device, such as a device from the data owner 102 or clients 118, can transmit the data management service request. As described herein, a data management service request can include one or more parameters, such as an identifier and/or a data payload. For example, the service endpoint can receive an entity create or update request from a client computing device. The example entity create or update request can include first entity data and first metadata. The third and fourth service calls 506, 508 described above with respect to FIG. 5A are example entity create or update requests.

At block 904, a type of the data management service request can be determined. In particular, the service gateway 124 can determine the type of the data management service request. Example types of data management service requests can generally include create or update operations, read operations, delete operations, configuration operations, and/or search operations. Examples of data management service requests are described in further detail above with respect to FIGS. 5A, 5B, 5C, 5D, and 7.

At block 906, service logic can be invoked for the request. In particular, the service gateway 124 can cause service logic, in the on-demand code execution system, to be invoked for the type of the data management service request. For example, there can be a handler for each type of data management service request that causes specific service logic to be executed in response to each request. The below blocks 908, 910, 912, 914, 916 each respectively describe different service logic invocations based on the type of the data management service request.

In some embodiments, some of the service logic can include schema validation. For example, if the data management service has been configured for schema validation, some of the requests received by the data management service can be initially validated against schema. An example schema 704 is described above with respect to FIG. 7.

Service logic that performs validation can be executed, such as by being executed on the on-demand code execution system. Invoking the validation service logic can cause the on-demand code execution system to determine whether data in the request has been successfully validated. For example, a schema for an entity can include one or more required properties. The one or more properties can include property types. In the example schema 704 of FIG. 7, "email" is a required property. Thus, the validation service logic can determine that submitted entity data does or does not confirm to the schema. Using the FIG. 7 example, if submitted entity data in an entity create or update request does not include a required property (here an "email" property) and/or the property is not of the appropriate type, a response can be sent that indicates a validation exception has occurred. As described herein, if data from a data management service is received that does not pass validation based at least on schema, then an error response can be returned. Conversely, if the request passes validation, then subsequent code can be invoked to further process the request, as described below.

At block 908, if the data management service request is a create or update request, then a create or update operation can be performed on an entity, metadata, and/or a reference. For example, in the case of an entity create or update request, a client has requested to either create or update an entity. Accordingly, service logic to create or update an entity and/or metadata can be executed, such as by being executed on the on-demand code execution system. Invoking the service logic can cause entity data to be stored in the entity data store and/or metadata for the entity to be stored in the metadata data store. In particular, the on-demand code execution instance 108A can store entity data in the entity data store and/or metadata in the metadata data store. The third and fourth calls 506, 508 of FIG. 5A are example create or update requests for an entity and metadata, respectively. In some embodiments, entity-related data, such as the entity data or metadata, can have item versions. Moreover, in some embodiments, the latest version of entity-related data, such as the entity data or metadata, can be stored in the entity data storage 120.

In the case of a reference create or update request, a client has requested to either create or update a reference between two or more entities. Service logic to create or update a reference between two or more entities can be executed, such as by being executed on the on-demand code execution system. Invoking the service logic to process a reference can cause data to be stored in one or more data stores, such as by storing an association between two or more entities. In some embodiments, the reference data store can include a graph database, and invoking the service logic can include storing a reference as an edge between a first vertex for a first entity and a second vertex for a second entity in the graph database. A reference data store can include the graph database. In particular, the on-demand code execution instance 108A can store edges and vertices in a graph in the reference data storage 114. In some embodiments, the edges of the graph can be directional. Additionally or alternatively, the on-demand code execution instance 108A can store reference data in the entity data storage 112.

At block 910, if the data management service request is a service configuration request, then a configuration operation can be performed on the data management service. For example, in the case of a service configuration request to add schema validation, a data owner 102 can transmit a request that includes a data schema, such as an entity schema. An example service configuration request is the request 702 of FIG. 7 that includes an example entity schema 704. Accordingly, service logic can be configured to perform data validation based at least on the schema following receiving of a service configuration request, such as by being configured to execute on the on-demand code execution system. In particular, the on-demand code execution instance 108A can be configured to validate data (such as entity data) against a schema (such as the entity schema). Thus, a data management service is configurable through service calls from the data owner and/or clients 102, 118.

As another example, in the case of a service configuration request to configure natural language search capabilities, a data owner 102 can transmit a request that includes a natural language search configuration. In response to receiving the service configuration request related to searching, the provisioning service 110 can instantiate the search service 120, which can be a natural language search service. As described herein, an example search service 120 can be an elastic search, such as the Amazon Elasticsearch Service. Service logic can be configured to stream entity data from the entity data store and/or metadata data store, such as by being configured to execute on the on-demand code execution system. In particular, the second on-demand code execution instance 108B can be configured to stream entity data from the entity data store and/or metadata from the metadata data store to the search service.

Stream services can also be used to feed data from the entity data storage 112 to other sources. For example, a first stream service 116A can receive updates to data stores in the entity data storage 112, which can be forwarded to second on-demand code execution instance(s) 108B to perform various actions, such as indexing and/or formatting data. Where an example entity data storage 112 is DynamoDB™, an example first stream service 116A can be DynamoDB™ Streams. In response to receiving the service configuration request related to searching, the provisioning service 110 can create a second stream service 116B to feed data into the search service 120. Where an example search service 120 is Amazon Elasticsearch Service, an example second stream service 116B can be Amazon Kinesis Data Firehose. The second on-demand code execution instance(s) 108B can be configured to format data received from the first stream service 116A to be compatible with the search service 120.

An example flow of data can include processing a create or update request and feeding that data into the search service 120. A service endpoint can receive an entity create or update request that includes entity data. First service logic can be invoked in the on-demand code execution system that processes by entity create or update request by storing the entity data in the entity data store. Second service logic can be invoked in the on-demand code execution system that streams data to the search service 120 based on the entity data. For example, the second service logic can format the entity data to be compatible for the search service 120.

An example service configuration request is the fifth service call 528 of FIG. 5C that includes a natural language search configuration. The example natural language search configuration can include a domain (shown as the placeholder "<domain>" in FIG. 5C) and an identify management role resource number (shown as the placeholder "<resourceNumber>" in FIG. 5C). The domain for a natural language search service can be a cluster of nodes. An identify management role can be used to control access to and from the second stream service 116B that feeds data to the search service 120.

A glue service can also be used to feed data from the entity data storage 112 to other sources. For example, the glue service 122 can receive updates to data stores in the entity data storage 112. As described herein, the glue service 122 can extract, transform, and load entity-related data into the data lake 132 for various purposes. An example flow of data can include processing a create or update (or delete) request and the glue service 122 can receive those updates. As described herein, a service endpoint can receive an entity create or update (or delete) request that includes entity data; and first service logic can be invoked in the on-demand code execution system that processes by entity create or update request by storing the entity data in the entity data store. The glue service 122 can store, in the data lake 132, a data catalog entry comprising a pointer to the entity data in the entity data store. As described in further detail below with respect to FIG. 10, an example use of the data lake 132 is for deduplication.

At block 912, if the data management service request is an entity and/or metadata retrieval request, then a retrieval operation can be performed on an entity data store and/or metadata data store. Service logic to retrieve entity and/or metadata can be executed, such as by being executed on the on-demand code execution system. Invoking the service logic can cause the entity data store and/or the metadata data store to be queried. In particular, the on-demand code execution instance 108A can query the entity data store and/or the metadata data store to retrieve entity data and/or metadata based at least on an identifier, such as an entity identifier. As described herein, the entity data store and/or the metadata data store can be indexed by one or more identifiers. The first service calls 502 of FIGS. 5A-5B are example entity retrieval requests. The first service call 523 of FIG. 5C is an example metadata retrieval request. The metadata 518 and entity data 520 of FIG. 5B is example data that can be retrieved from the metadata and entity data stores, respectively.

At block 914, if the data management service request is a query request, then a query operation can be performed to query a data store. Service logic to query a data store can be executed, such as by being executed on the on-demand code execution system. Invoking the service logic can cause an entity data store and/or metadata data store to be queried. In the case of an entity query request, one or more data stores can be queried to identify one or more entities. For example, the on-demand code execution instance 108A can query the entity data store to receive entity data based at least on an attribute value as a search parameter. The entity data store and/or the metadata data store can be indexed by attribute. The second service call 524 of FIG. 5C is an example entity query request.

In the case of another type of entity query request, the data lineage of an entity can be queried. Service logic can be invoked that causes a reference data store to be queried. For example, the on-demand code execution instance 108A can query the reference data store to receive second entity data based at least on a first entity as a search parameter. The third and fourth service calls 526A, 526B of FIG. 5C are example entity query requests. An additional search parameter can include a directional indicator, such as an upstream or downstream indicator. For example, an upstream search can cause a graph database to locate a vertex that represents the first entity as a leaf vertex and edges connected to the first entity can be traversed to identify other entities that reference the first entity. Conversely, a downstream search can cause a graph database to locate a vertex that represents the first entity as a root vertex and edges connected to the first entity can be traversed to identify other entities that the first entity references. An additional search parameter can include a search depth, which can indicate how many edge lengths are to be traversed to identify other entities. Accordingly, the search results can include zero or more entities.

In the case of another type of a natural language search request, a natural language search can be performed. The natural language search request can include a search term. Service logic to query the search service 120 can be executed, such as by being executed on the on-demand code execution system. Invoking the service logic can cause the search service 120 to be queried based at least on the search term, such as by using the search term as an input parameter to the search service 120. For example, the on-demand code execution instance 108A can query the search service 120 to receive entity data as a result from the search service 120.

At block 916, if the data management service request is a deletion request, then a deletion operation can be performed. Example data that can be deleted can include entity data, metadata, or reference data. Service logic to perform the deletion can be executed, such as by being executed on the on-demand code execution system. Invoking the service logic can cause a deletion in the entity data storage 112 or the reference data storage 114. For example, in response to receiving an entity deletion request that includes an entity identifier, the service logic can cause deletion of data from the entity data store and/or metadata data store based at least on the entity identifier. The sixth service call 512 of FIG. 5A is an example entity deletion request. The seventh service call 514 of FIG. 5A is an example attribute deletion request. In response to receiving an attribute deletion request that includes an entity identifier, the service logic can cause deletion of attribute data from the entity data store and/or metadata data store based at least on the entity identifier. Thus, a deletion request can partially delete elements of an entity and/or metadata.

In some embodiments, the data service provisioning system 104 can support different modes of deletion. For example, soft deletion can be supported where a deletion flag is set and the underlying data is kept. Additionally or alternatively, a hard deletion can be supported where data element(s) are deleted. The hard deletion can also retain some metadata for provability of the deletion, such as by retaining an identifier associated with the deletion.

At block 918, after processing of the request by the above block(s) 908, 910, 912, 914, 916, a response can be transmitted to the data owner 102 or data client 118. The response can indicate whether an action corresponding to the request was successful or not. Example response types are described in further detail above with respect to FIG. 6. The type of the response can also be based on the type of request.

For example, in the case of an entity create or update request, a response can indicate a successful or failed entity creation or update. In the case of an entity and/or metadata retrieval request, a response can include entity data and/or metadata if the retrieval was successful. In the case of an entity query request, such as a natural language search request, a response can include entity data if the query was successful. In the case of a reference create or update request, a response can indicate a successful or failed reference creation or update. In the case of an attribute or entity deletion request, a response can indicate a successful or failed entity or attribute deletion. With respect to any of the requests that are associated with schema validation, a response can include a validation exception if the input data failed a schema validation.

Figure 10:
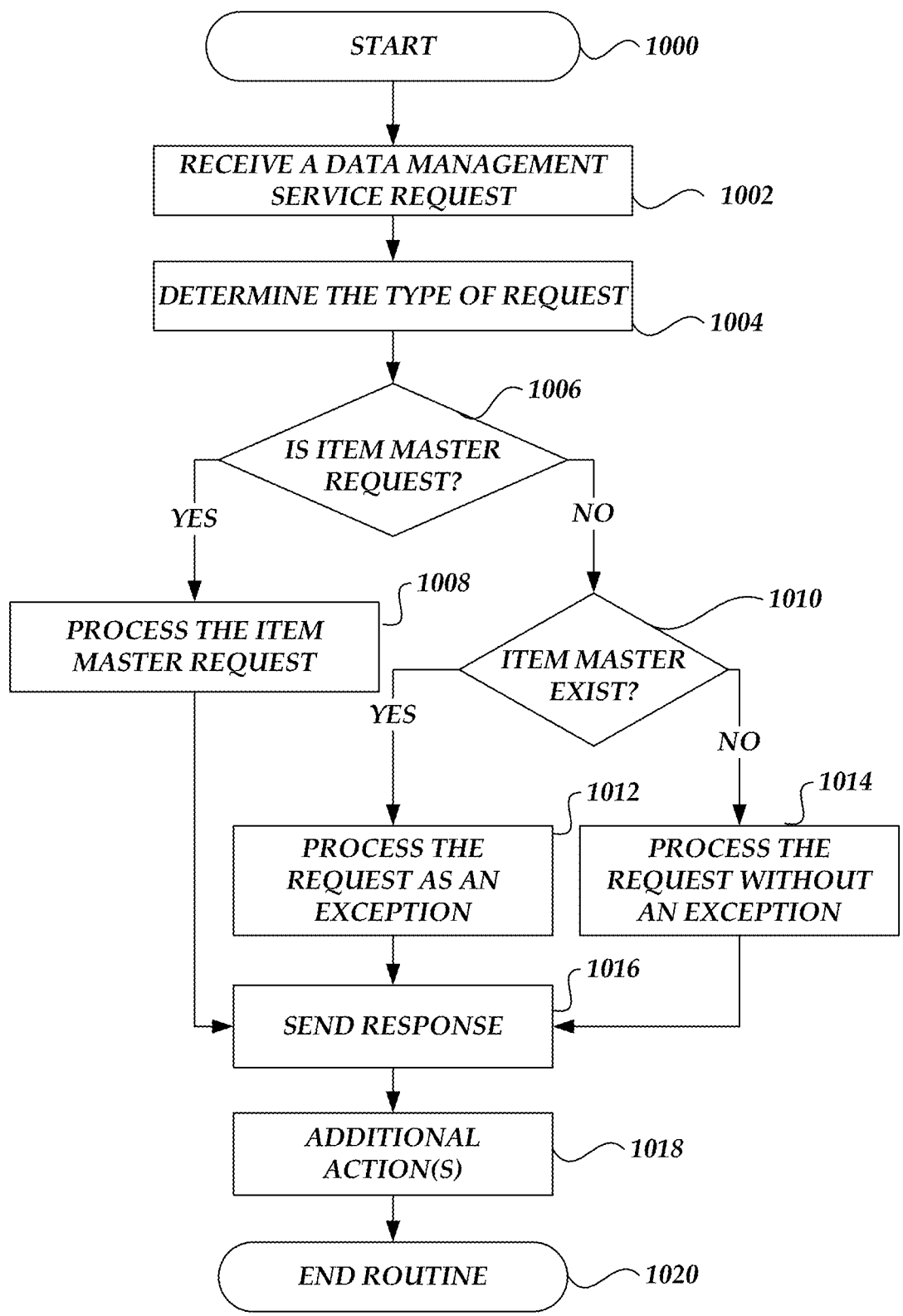
FIG. 10 is a flow diagram depicting an example method for master data management.

FIG. 10 is a flow diagram depicting an example method 1000 implemented by the provisioning application 216 for master data management. The method 1000 can be implemented by components of the data service provisioning system 104, such as the service gateway 124 and/or the on-demand code execution instance(s) 108A. The method 1000 of FIG. 10 for master data management may also be used in conjunction and/or may have overlapping blocks with the method 900 of FIGS. 9A-9B for processing data service management requests.

Beginning at block 1002, a data management service request can be received. Block 1002 of FIG. 10 for receiving a data management service request can be similar to block 902 of FIG. 9A for receiving a data management service request. For example, a service endpoint at the service gateway 124 can receive a data management service request. A client computing device, such as the de-duplication service, can transmit an item master request. A client computing device can also transmit an entity update request.

At block 1004, a type of the data management service request can be determined. Block 1004 of FIG. 10 for determining the type of data management service request can be similar to block 904 of FIG. 9A for determining the type of data management service request. For example, the service gateway 124 can determine the type of the data management service request. Example types of data management service requests related to master data management can generally include item master operations or create or update operations. Examples of data management service requests related to master data management are described in further detail above with respect to FIG. 5D.

At block 1006, different service logic can be invoked based on the type of the request. In particular, the service gateway 124 can route the request to different service logic based on the type of the request. For example, if the request is an item master request, the method 1000 can proceed to block 1008. Conversely, if the request is not an item master request, such as an entity create or update request, the method can proceed to block 1010.

At block 1008, in the case of an item master request, a client has requested to designate that an entity is an item master for another entity, and the item master request can be processed. The item master request can include a master identifier and a non-master identifier. The non-master identifier can be an identifier for a first entity and the master identifier can be an identifier for a second entity. Service logic can be invoked that creates an item master record in a data store, such as the entity data store. The item master record can include the master identifier and the non-master identifier. In some embodiments, the item master record can be included in the entity data and/or another data structure. As described herein, any service logic can be executed in the on-demand code execution system, and the service logic for master data management can be executed by the on-demand code execution instance(s). The first call 530 of FIG. 5D is an example item master request.

At block 1010, if the data management service request is a create or update request, then service logic can be invoked that determines whether an item master record exists for an entity. For example, in the case of an entity create or update request, a client has requested to either create or update an entity with a particular item identifier. Accordingly, service logic to create or update an entity and/or metadata can be executed, such as by being executed on the on-demand code execution system. Invoking the service logic can cause the on-demand code execution instance 108A to determine whether there is an item master record with an entity identifier that indicates that the correspond entity has an item master. In other words, a client is trying to create or update a duplicate entity. The second call 534 of FIG. 5D is an example entity update request.

At block 1012, if an item master exists, then the create or update request can be processed as an exception. Exception processing of the create or update request can depend on how the data management service is configured and/or the embodiment. For example, as described herein, if non-item master entity updates are permitted, updated entity data can be stored in the entity data store, but, in some embodiments, an advisory warning that another entity is the item master can be provided. An example advisory warning is the warning 538 described above with respect to FIG. 5D. Additional details of processing create or update requests to update the entity data storage 112 is described in further detail above with respect to block 908 of FIG. 9B. As also described herein, if non-item master entity updates are not permitted, then the entity update can be prevented and the response can include an exception that indicates that the entity update was denied and/or that an item master exists for the entity. At block 1014, if an item master does not exist, then the create or update request can be processed normally, which is described in further detail above with respect to block 908 of FIG. 9B.

At block 1016, a response can be sent. Block 1016 of FIG. 10 for sending a response can be similar to block 918 of FIG. 9B for sending a response. For example, the type of the response can also be based on the type of request. The response can indicate whether processing the item master request and/or the create or update request was successful or not. Example responses include the responses 532, 536 described above with respect to FIG. 5D. In the case of an item master record existing for a create or update request, the response can include an indication that an item master exists for the entity. Moreover, if non-item master entity updates are permitted, the response can also include an indication that the creation or update occurred and an advisory warning that the item master exists for the entity. As mentioned above, an example advisory warning is the warning 538 described above with respect to FIG. 5D. However, if non-item master entity updates are not permitted, the response can include an exception that indicates that the creation or update was denied.

At block 1018, additional actions can occur related to master data management. For example, a client de-duplication service 136 can execute independent of the data service provisioning system 104. For example, the de-duplication service 136 can process entity data in the data lake 132, and any duplicates and item masters that are identified can be communicated by the de-duplication service 136 back to the data service provisioning system via the data management service and the service gateway 124. For example, the de-duplication service 136 can invoke a service call, such as the first service call 530 of FIG. 5D that sets an item master. In some embodiments, the de-duplication service 136 can use machine learning models to process duplicates.

While many embodiments discuss using an on-demand code execution system, it will be appreciated that the systems and methods described herein for data management may not use an-demand code execution system.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Further, the term "each", as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
  under control of a computer hardware processor configured with specific computer executable instructions,
    receiving, from a user computing device via a graphical user interface, a data management service creation request comprising a service identifier, an entity definition, and a metadata definition;
    creating an entity data store based at least on the entity definition;
    creating a metadata data store based at least on the metadata definition;
    configuring service logic to be executed in an on-demand code execution system, wherein the service logic references the entity data store and the metadata data store, wherein configuring the service logic further comprises:
      defining a function configured to create or update entity data in the entity data store;
      creating a service endpoint for the service identifier, wherein the service endpoint provides an Application Programming Interface (API);
      connecting the service endpoint and the service logic;
    receiving, via the API, an entity create or update request from a client computing device, the entity create or update request comprising first entity data and first metadata;
    invoking, in the on-demand code execution system, the service logic to process the entity create or update request, wherein invoking the service logic further comprises:
      storing, according to the function, the first entity data in the entity data store; and
      storing the first metadata in the metadata data store; and
    transmitting, to the client computing device, a response indicating a successful entity creation or update.

2. The computer-implemented method of claim 1, wherein the first entity data comprises a first entity identifier, the computer-implemented method further comprising:
  receiving, via the API, an entity retrieval request comprising the first entity identifier;
  invoking, in the on-demand code execution system, second service logic to process the entity retrieval request, wherein invoking the second service logic further comprises:
    retrieving the first entity data from the entity data store based at least on the first entity identifier; and
    retrieving the first metadata from the metadata data store based at least on the first entity identifier; and
    transmitting a second response to the entity retrieval request, the second response comprising the first entity data and the first metadata.

3. The computer-implemented method of claim 1, wherein the first entity data comprises a first attribute value, the computer-implemented method further comprising:
  receiving, via the API, an entity query request comprising the first attribute value;
  invoking, in the on-demand code execution system, second service logic to process the entity query request, wherein invoking the second service logic further comprises:
    querying, the entity data store, based at least on the first attribute value as a search parameter; and
    in response to querying the entity data store, receiving the first entity data as a result; and
  transmitting a second response to the entity query request, the second response comprising the first entity data.

4. The computer-implemented method of claim 1 further comprising:
  receiving, via the API, a reference create or update request comprising a first reference from a first entity identifier to a second entity identifier, wherein the first reference indicates an association from a first entity to a second entity; and
  invoking, in the on-demand code execution system, second service logic to process the reference create or update request, wherein invoking second service logic to process the reference create or update request further comprises:
    storing, in a reference data store, the first reference as an association between the first entity and the second entity.

5. The computer-implemented method of claim 4 further comprising:
  receiving, via the API, an entity-query request comprising the first entity identifier;

invoking, in the on-demand code execution system, second service logic to process the entity query-request, wherein invoking the second service logic further comprises:
querying, the reference data store, based at least on the first entity identifier as a search parameter; and
in response to querying the reference data store, receiving the second entity as a search result; and
transmitting a second response to the entity query-request, the second response comprising second entity data for the second entity.

6. The computer-implemented method of claim 5, wherein the reference data store comprises a graph database, and wherein the entity query request comprises a search depth, wherein querying the reference data store further comprises querying the graph database using the search depth, and wherein the search result further comprises a plurality of entities.

7. A system comprising:
a data storage medium; and
one or more computer hardware processors in communication with the data storage medium, wherein the one or more computer hardware processors are configured to execute computer-executable instructions to at least:
receive, from a user computing device via a graphical user interface, a data management service creation request comprising a service identifier and an entity definition;
create an entity data store based at least on the entity definition;
configure service logic to be executed in an on-demand code execution system, wherein the service logic references the entity data store, wherein to configure the service logic, the one or more computer hardware processors are configured to execute the computer-executable instructions to at least:
define a function configured to create or update entity data in the entity data store;
create a service endpoint for the service identifier, wherein the service endpoint provides an Application Programming Interface (API);
receive, via the API, an entity create or update request from a client computing device, the entity create or update request comprising first entity data;
invoke, in the on-demand code execution system, the service logic to process the entity create or update request, wherein to invoke the service logic, the one or more computer hardware processors are configured to execute the computer-executable instructions to at least:
store, according to the function, the first entity data in the entity data store; and
transmit, to the client computing device, a response indicating a successful entity creation or update.

8. The system of claim 7, wherein the one or more computer hardware processors are configured to execute further computer-executable instructions to at least:
receive, via the API, an item master request, the item master request comprising a master identifier and a non-master identifier, wherein a value of the non-master identifier is a first identifier for the first entity data; and
store, in the entity data store, an item master record comprising the master identifier and the non-master identifier.

9. The system of claim 8, wherein the one or more computer hardware processors are configured to execute additional computer-executable instructions to at least:
receive, via the API, an entity update request, the entity update request comprising the first identifier;
invoke, in the on-demand code execution system, second service logic to process the entity update request, wherein to invoke the second service logic, the one or more computer hardware processors are configured to execute the additional computer-executable instructions to at least:
determine that the item master record exists for the first identifier; and
transmit a second response to the entity update request, the second response indicating that an item master exists for a first entity.

10. The system of claim 9, wherein the entity update request further comprises updated first entity data, and wherein to invoke the second service logic, the one or more computer hardware processors are configured to execute other computer-executable instructions to at least:
store the updated first entity data in the entity data store, and wherein the second response further indicates that the update occurred, the second response further comprising an advisory warning that the item master exists for the first entity.

11. The system of claim 9, wherein to invoke the second service logic, the one or more computer hardware processors are configured to execute other computer-executable instructions to at least: prevent an entity update for the first entity, and wherein the second response further comprises an exception that indicates that the entity update was denied.

12. The system of claim 7, wherein the first entity data comprises a first entity identifier, and wherein the one or more computer hardware processors are configured to execute further computer-executable instructions to at least:
receive, via the API, an entity deletion request comprising the first entity identifier;
invoke, in the on-demand code execution system, second service logic to process the entity deletion request, wherein to invoke the second service logic, the one or more computer hardware processors are configured to execute the further computer-executable instructions to at least:
delete the first entity data from the entity data store based at least on the first entity identifier; and
transmit a second response to the entity deletion request, the second response indicating a successful entity deletion.

13. The system of claim 7, wherein the first entity data comprises a first entity identifier, and wherein the one or more computer hardware processors are configured to execute further computer-executable instructions to at least:
receive, via the API, an attribute deletion request comprising the first entity identifier and an attribute identifier;
invoke, in the on-demand code execution system, second service logic to process the entity deletion request, wherein to invoke the second service logic, the one or more computer hardware processors are configured to execute the further computer-executable instructions to at least:
deleting attribute data from the entity data store based at least on the first entity identifier; and
transmit a second response to the entity deletion request, the second response indicating a successful attribute deletion.

14. The system of claim 7, wherein to invoke, in the on-demand code execution system, the service logic, the one or more computer hardware processors are configured to execute further computer-executable instructions to at least execute code in a virtual machine instance.

15. A system comprising:
a data storage medium; and
one or more computer hardware processors in communication with the data storage medium, wherein the one or more computer hardware processors are configured to execute computer-executable instructions to at least:
  receive, from a user computing device via a graphical user interface, a data management service creation request comprising a service identifier and an entity definition;
  create an entity data store based at least on the entity definition;
  configure service logic to be executed in an on-demand code execution system, wherein the service logic references the entity data store, wherein to configure the service logic, the one or more computer hardware processors are configured to execute the computer-executable instructions to at least:
    define a function configured to create, update, or delete entity data in the entity data store;
  create a service endpoint for the service identifier, wherein the service endpoint provides an Application Programming Interface (API);
  connect the service endpoint and the service logic; and
  publish the service endpoint.

16. The system of claim 15, wherein the one or more computer hardware processors are configured to execute further computer-executable instructions to at least:
  receive, via the API, a service configuration request comprising an entity schema, the entity schema comprising a required property for an entity; and
  configure second service logic to be executed in the on-demand code execution system, wherein the second service logic is configured to validate entity data against the entity schema.

17. The system of claim 16, wherein the one or more computer hardware processors are configured to execute additional computer-executable instructions to at least:
  receive, via the API, an entity create or update request from a client computing device, the entity create or update request comprising first entity data;
  invoke, in the on-demand code execution system, the second service logic to process the entity create or update request, wherein the second service logic is further configured to at least:
    determine that the first entity data does not conform to the entity schema and the required property; and
  transmit, to the client computing device, a response indicating a validation exception.

18. The system of claim 15, wherein the one or more computer hardware processors are configured to execute further computer-executable instructions to at least:
  receive, via the API, a service configuration request comprising a natural language search configuration;
  instantiate a natural language search service based at least on the natural language search configuration; and
  configure second service logic to be executed in the on-demand code execution system, wherein the second service logic is configured to stream entity data from the entity data store to the natural language search service.

19. The system of claim 18, wherein the one or more computer hardware processors are configured to execute additional computer-executable instructions to at least:
  receive, via the API, an entity create or update request, the entity create or update request comprising first entity data;
  invoke, in the on-demand code execution system, the service logic to process the entity create or update request, wherein to invoke the service logic the one or more computer hardware processors are configured to execute the additional computer-executable instructions to at least:
    store, according to the function, the first entity data in the entity data store; and
  invoke, in the on-demand code execution system, the second service logic, wherein to invoke the second service logic, the one or more computer hardware processors are configured to execute the additional computer-executable instructions to at least:
    stream data to the natural language search service based at least on the first entity data.

20. The system of claim 19, wherein the one or more computer hardware processors are configured to execute other computer-executable instructions to at least:
  receive, via the API, a natural language search request comprising a search term;
  invoke, in the on-demand code execution system, third service logic to process the natural language search request, wherein to invoke the third service logic, the one or more computer hardware processors are configured to execute the other computer-executable instructions to at least:
    query the natural language search service based at least on the search term; and
    receive, from the natural language search service, the first entity data as a result; and
  transmit a response to the natural language search request, the response comprising the first entity data.

21. The system of claim 15, wherein the one or more computer hardware processors are configured to execute further computer-executable instructions to at least:
  receive, via the API, an entity create or update request, the entity create or update request comprising first entity data;
  invoke, in the on-demand code execution system, the service logic to process the entity create or update request, wherein to invoke the service logic, the one or more computer hardware processors are configured to execute the further computer-executable instructions to at least:
    store, according to the function, the first entity data in the entity data store; and
    store, in a data lake, a data catalog entry comprising a first pointer to the first entity data in the entity data store.

\* \* \* \* \*